July 28, 1925.  1,547,335
E. N. LIGHTFOOT ET AL
FILLING MACHINE
Filed Jan. 28, 1921  7 Sheets-Sheet 1
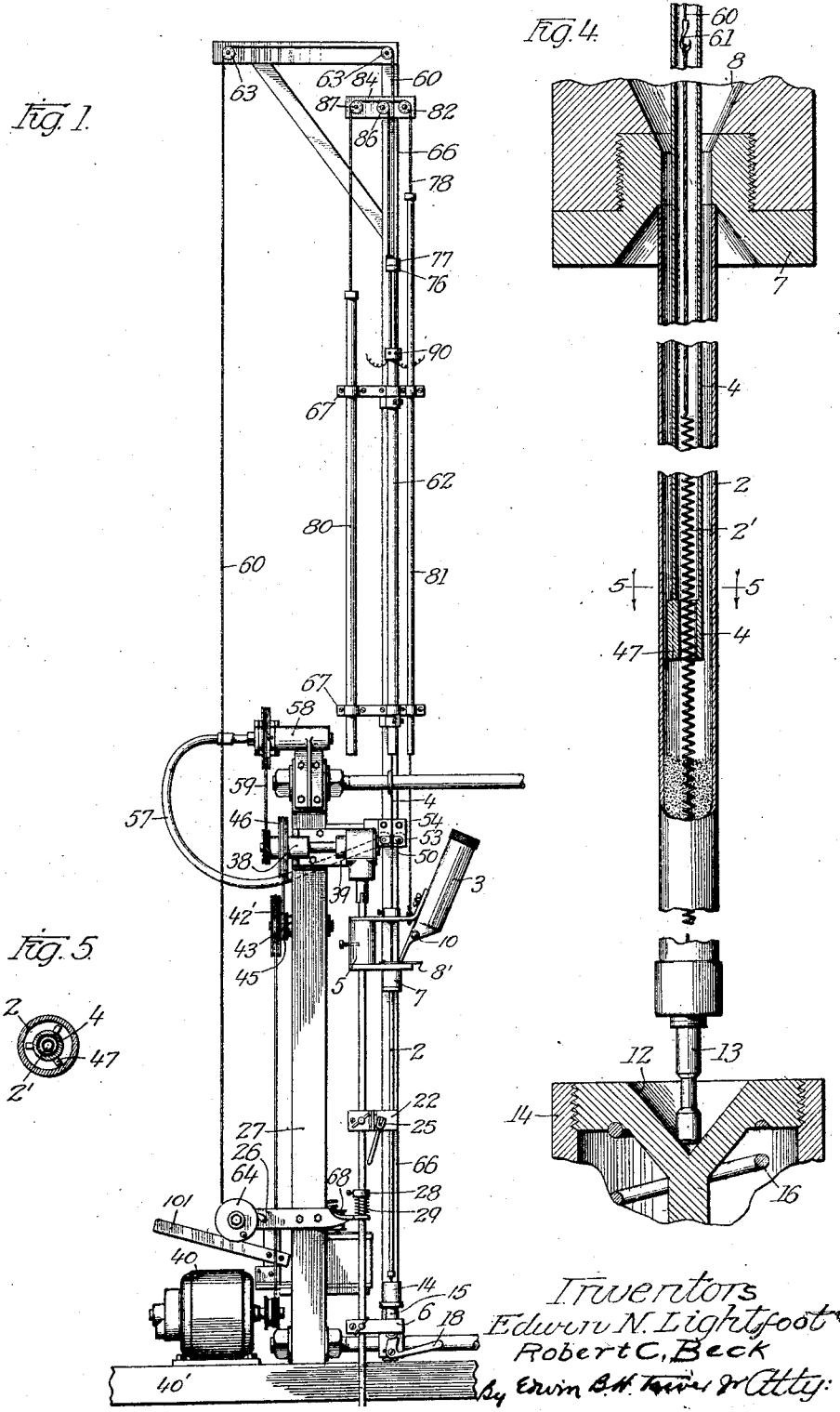

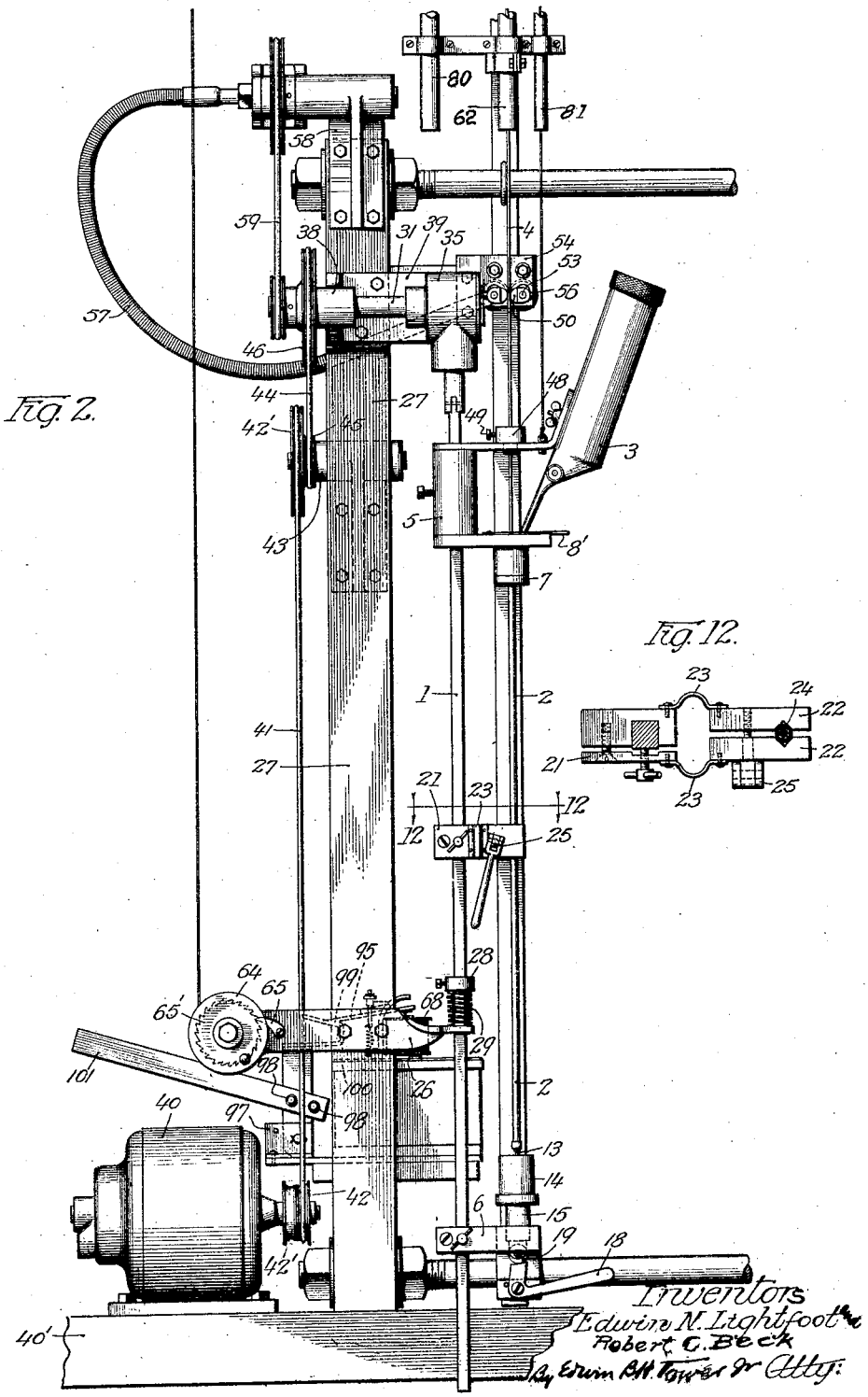

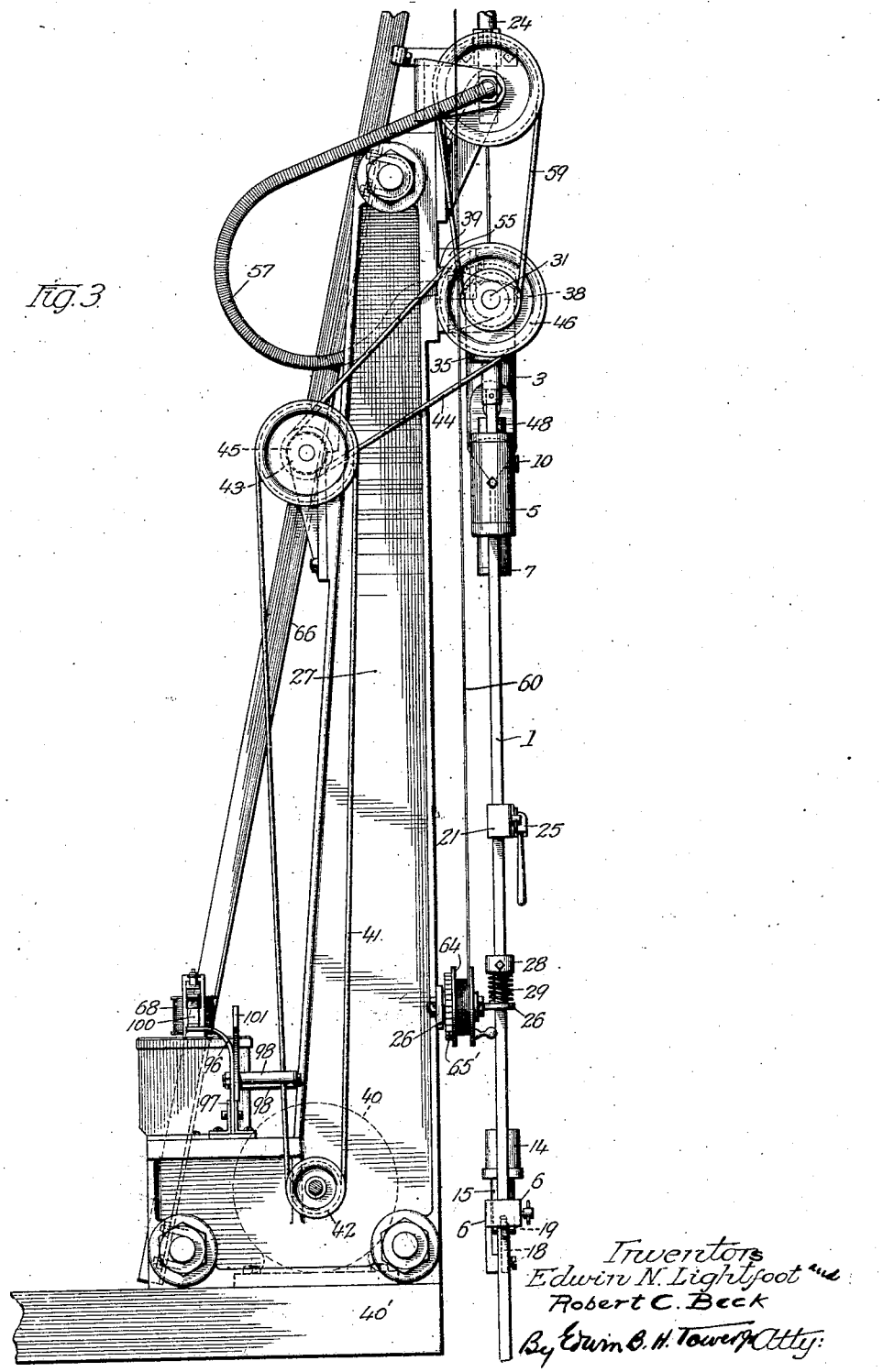

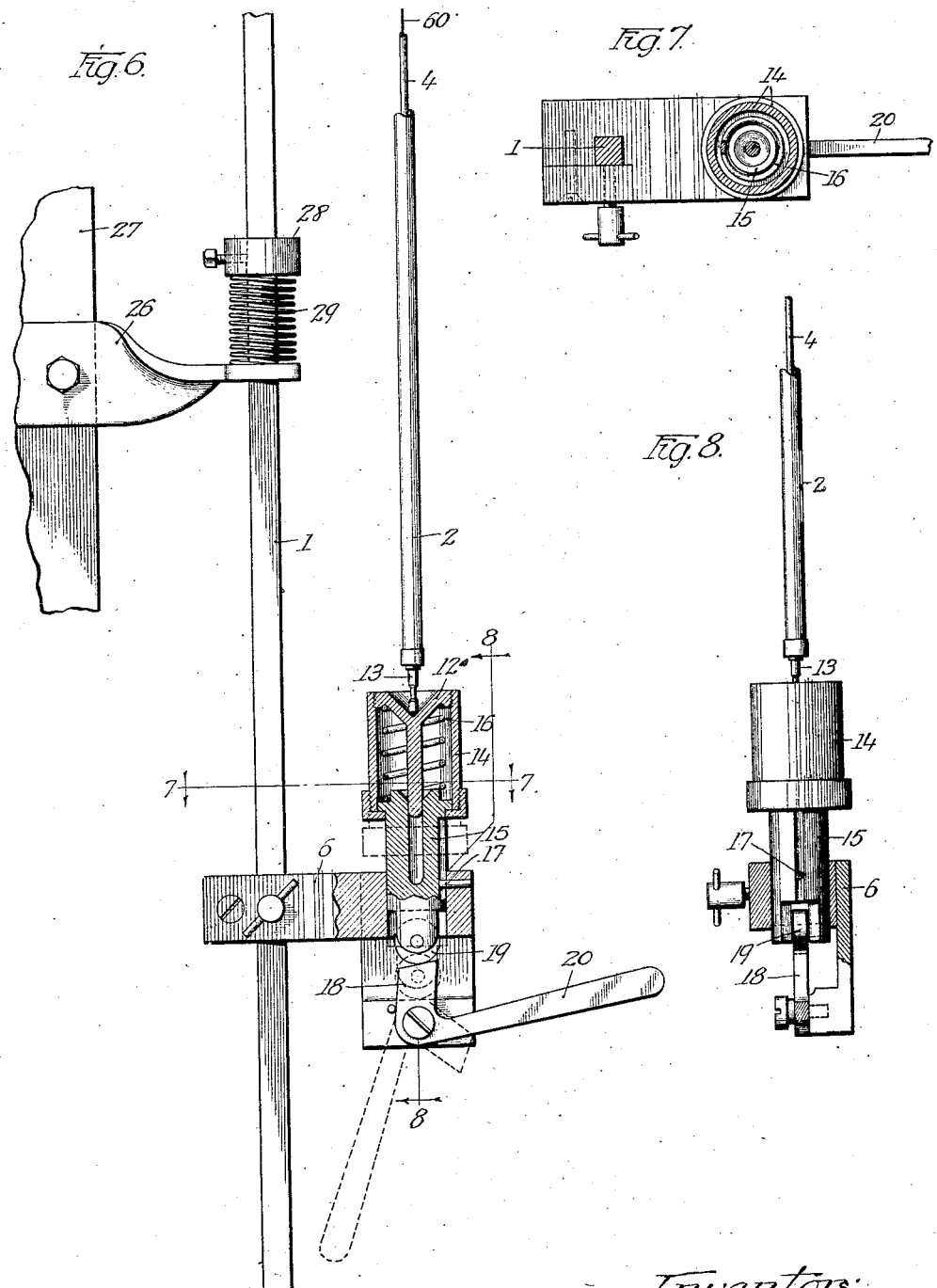

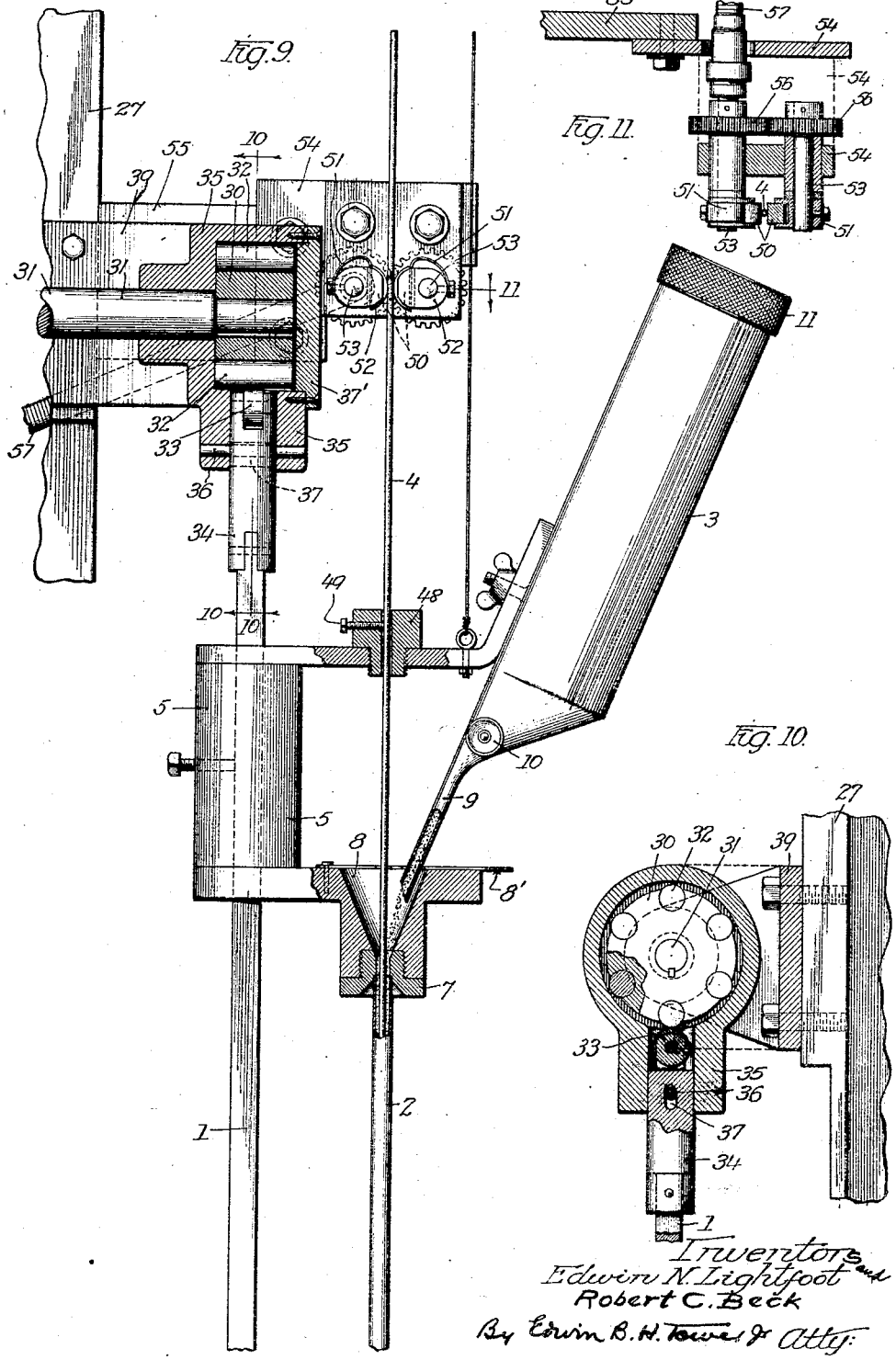

July 28, 1925.
E. N. LIGHTFOOT ET AL
1,547,335
FILLING MACHINE
Filed Jan. 28, 1921 7 Sheets-Sheet 6
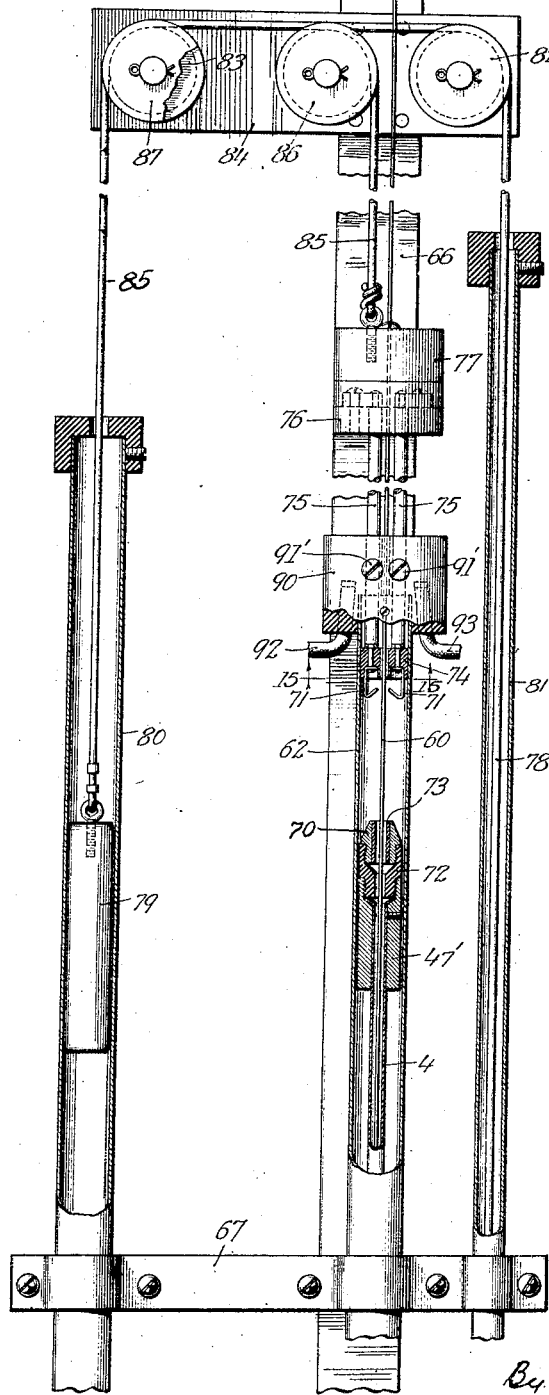
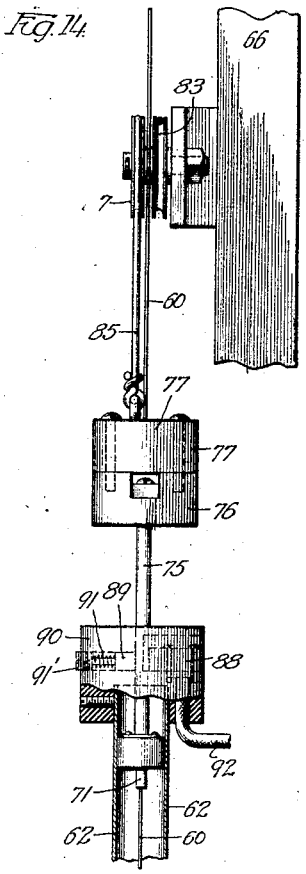
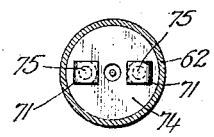
Inventors
Edwin N. Lightfoot
Robert C. Beck
By Edwin B. H. Tower Jr. Atty.

July 28, 1925.
E. N. LIGHTFOOT ET AL
1,547,335
FILLING MACHINE.
Filed Jan. 28, 1921 7 Sheets-Sheet 7
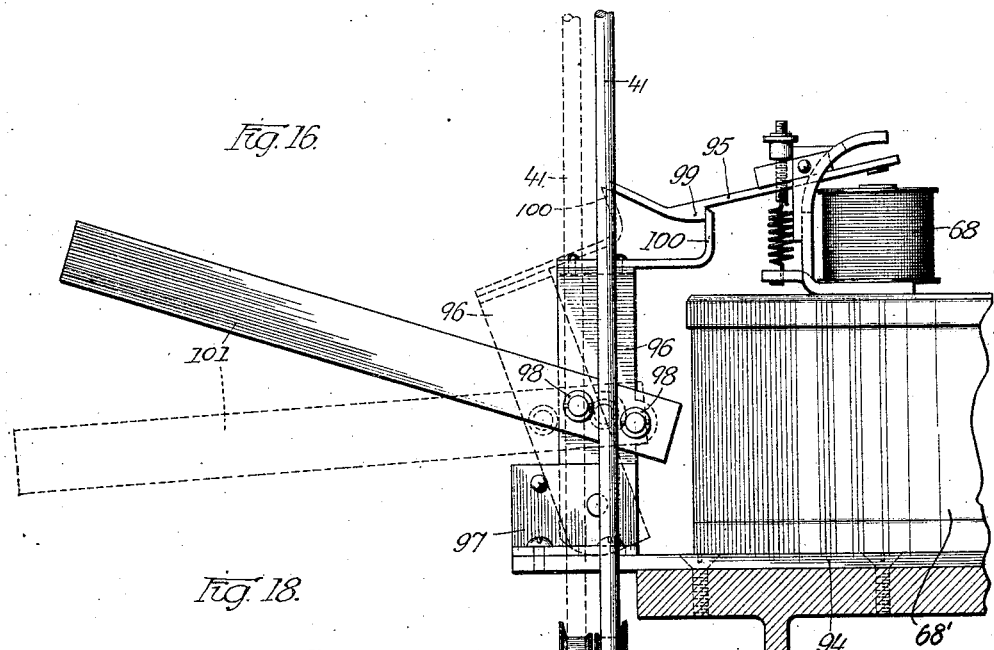
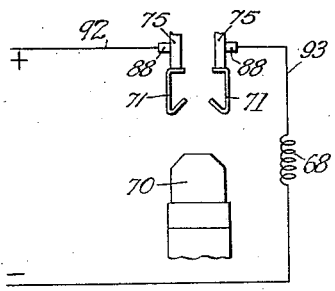
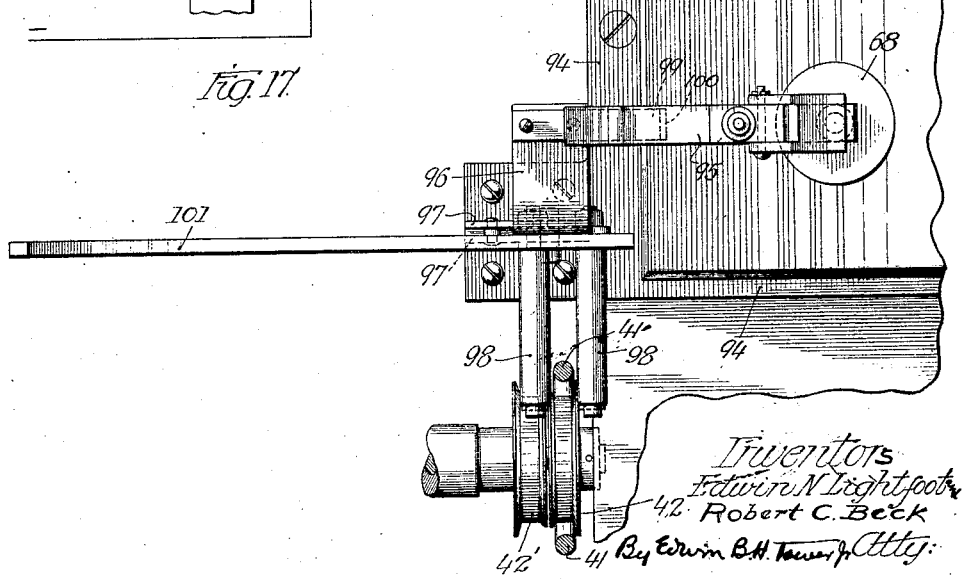

Patented July 28, 1925.

1,547,335

UNITED STATES PATENT OFFICE.

EDWIN N. LIGHTFOOT, OF NEW YORK, AND ROBERT C. BECK, OF BROOKLYN, NEW YORK, ASSIGNORS TO THE CUTLER-HAMMER MFG. CO., OF MILWAUKEE, WISCONSIN, A CORPORATION OF WISCONSIN.

FILLING MACHINE.

Application filed January 28, 1921. Serial No. 440,663.

*To all whom it may concern:*

Be it known that we, EDWIN N. LIGHTFOOT and ROBERT C. BECK, citizens of the United States, residing, respectively, at New York, in the county of Bronx and State of New York, and Brooklyn, in the county of Kings and State of New York, have invented new and useful Improvements in Filling Machines, of which the following is a specification.

This invention relates to a filling machine.

More particularly it relates to a machine for filling the tubular jacket of an electric heater with powdered or granular insulation, which positions the resistor thereof in the jacket and insulates it therefrom.

An object of the invention is to provide an improved filling machine.

Another object is to provide a filling machine which center the resistor within the insulation, separating it from the jacket.

Another object is to provide a filling machine which will compress the insulation within the jacket.

Another object is to provide a rapid and efficient filling machine.

Another object is to provide a filling machine by which the wastage of insulation is lessened.

Another object is to provide an efficient machine for filling jackets of different sizes.

Other objects and advantages will hereinafter appear.

The invention is being illustrated in connection with a machine for filling the tubular jackets of electric heaters with powdered or granular insulation, but it is to be understood, of course, that it is susceptible of various other embodiments and adaptations.

In the drawing:

Figure 1 is a front a front elevation of the filling machine and the associated automatic stop.

Fig. 2 is an enlarged front elevation of the filling machine.

Fig. 3 is an enlarged side elevation of the filling machine.

Fig. 4 is a vertical section through a tubular jacket seated in the upper and lower brackets of the vibratory carrier.

Fig. 5 is a horizontal section on line 5—5 of Fig. 4.

Fig. 6 is a front elevation of the lower end of the vibratory carrier, the lower bracket thereof being in section.

Fig. 7 is a horizontal section on line 7—7 of Fig. 6.

Fig. 8 is a side elevation, partly in section, of the lower bracket showing the yielding seat.

Fig. 9 is a vertical section through the upper end of the vibratory carrier and the vibrator therefor and the tamper lifter.

Fig. 10 is a vertical section on line 10—10 of Fig. 9, showing the vibrator.

Fig. 11 is a horizontal section on line 11—11 of Fig. 9, showing the tamper lifter.

Fig. 12 is a top plan of the clamp for holding the tubular jacket in the vibratory carrier.

Fig. 13 is an enlarged front elevation, partly in section, of the controller for the automatic stop.

Fig. 14 is a side elevation of the controller.

Fig. 15 is a horizontal section on line 15—15 of Fig. 13.

Fig. 16 is a front elevation of the belt shifter and the operating magnet therefor.

Fig. 17 is a top plan of the belt shifter and the operating magnet therefor.

Fig. 18 diagramatically illustrates the automatic stop, showing the connections between the belt shifter magnet and the controller therefor.

The filling machine comprises, in general, a vibratory carrier 1 for the jacket 2 of the electric heater, a container 3 from which insulation is fed into the jacket, a tamper 4 for compressing the insulation in the jacket, as it is being filled, and means for automatically stopping the machine when the jacket is filled with insulation.

Vibratory carrier.

The vibratory carrier 1, which may take the form of a square or rectangular rod, is provided with an upper bracket 5 and a lower bracket 6 between which the jacket is supported.

These brackets are adjustable on the carrier so as to accommodate jackets of varying lengths.

The lower arm of the upper bracket 5 (Fig. 9) carries a removable bushing 7 recessed to receive the upper end of the jacket 2. Bushings having openings of different sizes will, of course, be required for jackets of different diameters.

The lower arm of the upper bracket 5 is provided with a funnel 8 communicating with the upper end of the jacket 2 through the bushing 7 and arranged to receive insulation fed thereto from the container 3 through its spout 9. The flow of insulation from the container may be regulated by means of a valve 10 in the spout 9.

A cover 8' for the funnel 8, hinged on the lower arm of bracket 5 prevents the escape of insulation from the funnel, thus lessening the waste of insulation.

The container 3 is fastened to the upper arm of bracket 5 so as to hold its spout in fixed relation to the funnel 8.

The insulation in powdered or granular form may be introduced into the container 3 through the upper end thereof, which is provided with a removable cap 11.

The lower bracket 6 (Figs. 6, 7 and 8) has a tapered yielding seat 12 for receiving the electric heater terminal 13 rigidly fastened to the jacket 2. The tapered seat 12 forms a head for a cylinder or casing 14, which is arranged to receive a plunger 15. A coiled compression spring 16 arranged in the cylinder and seated against the plunger 15 and the head 12 tends to keep the cylinder in elevated position. The piston 15 extends into an opening in the bracket 6 and is prevented from turning with respect thereto by means of a key 17 held by the bracket 6 and extending into a longitudinal slot in the piston.

The piston 15 may be raised and lowered by means of a cam 18 pivoted on a depending extension of the bracket 6 and cooperating with a roller 19 on the lower end of the piston. The cam 18 when moved from its full line to its dotted line position, as by means of a handle 20, allows the piston 15 to move from its upper to its lower position carrying therewith the yielding seat 12.

To keep the jacket 2 straight and thus prevent bending or buckling thereof, it is held intermediate its ends in fixed relation to the carrier 1. For this purpose a bracket 21 rigidly fastened to the carrier 1 and adjustable thereon carries a pair of jaws 22 fastened thereto by means of springs 23, which tend to hold the jaws apart. These jaws have opposing grooves or slots 24 arranged to receive the jacket 2 and to be clamped thereagainst by means of a clamping screw 25.

Thus, when arranging the jacket in the carrier 1, the yielding seat 12 is lowered and the electric heater terminal fastened to the jacket is seated therein. The upper end of the jacket is then arranged beneath the bushing 7, and the yielding seat 12 is raised so that the upper end of the jacket is moved into the recessed bushing 7. The jacket is then clamped between the clamping jaws 22. The lower yielding seat insures the positive engagement of the upper and lower ends of the jacket with the bushing 7 and the seat 12.

*Carrier vibrator.*

The vibratory carrier 1 is resiliently supported by a bracket 26 (Fig. 6) secured to an upright or standard 27. The vibratory carrier extends through an opening in the bracket 26 and has a collar 28 adjustable thereon resting upon a compression spring 29 surrounding the carrier 1 and seated on the bracket 26.

The vibrator (Figs. 9 and 10) by which the carrier 1 is vibrated comprises a rotatable disc 30 mounted upon a shaft 31 and carrying in grooves in the periphery thereof a plurality of evenly spaced rollers 32 which project beyond the periphery of the disc 30.

These rollers 32 successively engage a roller 33 carried in the upper end of a sleeve 34 fixed to the carrier 1. The sleeve 34, which is adapted to reciprocate in a vertical opening in the vibrator housing 35, is prevented from turning with respect thereto by means of a pin 36 fixed in the housing and extending through an elongated opening 37 in the sleeve 34.

A cover plate 37' prevents longitudinal movement of the rollers 32, and keeps dirt and other foreign substances out of the vibrator housing.

As the disc 30 rotates, the rollers 32 carried thereby successively engage the roller 33 of the carrier 1, and as a roller 32 engages the roller 33, the carrier is forced downward against the action of spring 29. As a roller 32 moves out of engagement with the roller 33, the spring 29 forces the carrier 1 upward until the roller 33 engages the periphery of the disc 30.

Thus, during the rotation of the disc 30, the carrier 1 is rapidly vibrated through a distance determined by the amount which the rollers 32 extend beyond the periphery of the disc 30.

It has been found that satisfactory results are obtained by vibrating the carrier 1 one-sixteenth ($\frac{1}{16}$) of an inch.

The shaft 31 is journaled in the vibrator housing 35 and in a bearing 28 (Fig. 2) carried by a bracket 39 rigidly fastened to the standard 27.

The vibrator shaft 31 may be driven from a suitable motor 40 (Fig. 2) mounted upon a base 40' to which the standard 27 is rigidly fastened. This driving connection is established through a belt 41 which connects a pulley 42 fixed to the motor shaft with a pulley 42' on an intermediate shaft journaled in a bracket 43 rigidly fastened to standard 27, the intermediate shaft being connected with the vibrator shaft 31 by means of a belt 44 passing over the pulley 45 on the former and a pulley 46 on the latter.

The rate of vibration of the carrier 1 may be changed readily by varying the speed of the motor 40.

The vibration of the carrier 1 causes the insulation to flow freely from the container 3 through the funnel 8 and bushing 7 and down into the jacket 2.

The constant vibration of the jacket 2 aids in filling with insulation all space around and about a helical resistor arranged in the jacket, and prevents clogging of the insulation in the upper part of the jacket before the lower part is filled.

Tamper.

The tamper 4 (Figs. 4 and 13) is in the form of a tube having an internal diameter such that the tamper will slide freely over the helical resistor 2' arranged in the jacket 2.

The tubular tamper 4, provided with outwardly extending radial lugs 47, extends into the jacket and serves to center and position the resistor 2' and compress the insulation.

The radial lugs 47 while spacing the tubular tamper from the jacket allows the free passage of the insulation therebetween.

The tubular tamper extends through the bushing 7 and the funnel 8, through a bushing 48 in the upper arm of the bracket 5, and into a guide tube 62.

The tubular tamper has at its upper end a tubular weight 47' which increases the effectiveness of the tamper.

By means of a thumb screw 49 (Fig. 9) in the bushing 48, the tubular tamper 4 may be locked in raised position when positioning a heater jacket in the vibratory carrier.

The tubular tamper 4 above the radial spacing lugs at the bottom thereof cooperates with the tubular jacket to form an unobstructed annular passageway for the insulation.

Tamper lifter.

The lifter (Figs. 9 and 11) for periodically lifting the tubular tamper 4 comprises a pair of rotatable yielding jaws or shoes 50, each fastened to one end of a flat spring 51, the other end of which is secured to a collar 52 fixed on a rotatable shaft 53. Each collar 52 is slotted to receive and guide the jaw or shoe supported thereby. The shafts 53 are journaled in a bracket 54, which is rigidly fastened to the upright or standard 27 by means of a plate 55, the bracket 54 being bolted to the plate 55, which is in turn bolted to the standard. Meshing spur gears 56 are fixed to the shafts 53 so that the rotation of one shaft causes the other to rotate at the same speed but in the opposite direction.

A flexible shaft 57 (Fig. 2) connects one of the shafts 53 with an intermediate shaft journaled in a bracket 58 fastened to the standard 27. This intermediate shaft is driven from the vibrator shaft 31 by means of a belt 59 passing over pulleys on the respective shafts.

As the shafts 53 are rotated, the yielding jaws or shoes 50 carried thereby engage the tubular tamper 4 and lift the same a distance of about one-half (½) inch and then move out of engagement therewith, allowing the tamper 4 to drop, thus tamping or compressing the insulation in the jacket 2.

While the tamper is being lifted and dropped periodically, the jacket is gradually filling with insulation; consequently the insulation is rising higher and higher in the jacket.

Thus, while the jaws 50 always lift the tamper 4 the same distance, the point from which the tamper is lifted is continually changing as the insulation rises in the jacket; consequently the tamper is gradually raised independently of the lifter until the jacket is filled.

Resistor support.

In order that the tubular tamper 4 may slide freely over the helical resistor 2' as it is periodically lifted and dropped, it is desirable that the helical resistor be maintained fairly taut; consequently the resistor is kept under tension while the jacket is being filled with insulation.

The tension maintaining means or support comprises a cord 60 (Figs. 1, 4 and 13) having at its lower end a hook 61 (Fig. 4) for engaging the upper end of the resistor 2' and extending up through the tubular tamper 4 and the guide tube 62 and over guide pulleys 63 onto a reel 64 (Fig. 1) supported on one end of the bracket 26 (Fig. 1). The desired tension on the resistor may be obtained by rotating the drum 64 and winding the cord thereon. A pawl 65 engaging a ratchet wheel 65' on the reel 64 prevents backward turning thereof.

The guide pulleys 63 are supported by a frame 66, while the guide tube 62 is held in brackets 67 fastened to the frame 66.

When the jacket is filled with insulation in the manner described, the filling machine may be stopped, and the filled jacket removed therefrom and another arranged in filling position therein.

The filling machine is equipped with means for automatically stopping the same when the jacket is filled with insulation or when the insulation reaches a predetermined height in the jacket.

The automatic stopping means, comprises, in general, a belt shifter for disconnecting the filling machine from the source of power therefor, a belt shifter magnet 68, and a controller for the belt shifter magnet 68.

The controller (Fig. 13) for the belt shifter magnet 68 comprises a movable contact 70 and a pair of relatively stationary contacts 71. The movable contact 70 is mounted on the upper end of the tubular tamper 4 and is separated therefrom and from the metallic weight 47' by an insulating bushing 72 and from the metallic tension cord 60 by an insulating bushing 73.

The relatively stationary contacts are mounted upon an insulating disk 74 and are connected to conducting rods 75 depending from an insulating block 76 fastened to a weight 77.

In order that the filling machine always may be automatically stopped at the proper time when jackets of different lengths are being filled, the contacts 71 of the controller are adjustably supported within the guide tube 62; and these contacts are so interlinked with the adjustable upper bracket 5 of the vibratory carrier that when the bracket is raised or lowered on the carrier, the contacts are raised or lowered the same distance.

For this purpose, the upper arm of the adjustable bracket 5 is connected by means of a cord 78 with a counterweight 79 slidable in a guide tube 80, held in the brackets 67. The cord 78 passes through a protective guide tube 81 and over guide pulleys 82 and 83 supported on the plate 84 fastened to the frame 66. The weight 77, from which contacts 71 depend, is also connected with the counterweight 79 by means of a cord 85 passing over pulleys 86 and 87.

Thus when the bracket 5 is raised, the counterweight 79 will be lowered, raising the contacts 71 the same distance that the bracket 5 is raised.

If the bracket 5 be lowered, the counterweight 79 will be raised, allowing the contacts 71 to be lowered the same distance that the bracket 5 is lowered.

The separated contacts 71 are connected in the operating circuit of the belt shifter magnet 68 and when engaged by the movable contact 70 the belt shifter magnet operates.

The contact rods 75 to which the controller contacts 71 are connected are yieldingly held in frictional engagement with spaced electric terminal blocks 88 by means of spring pressed shoes 89.

Conducting leads 92 and 93 connected to the respective terminal blocks serve to connect the contacts 71 of the controller in circuit with the operating winding of the belt shifter magnet 68 and a source of electric power.

The terminals 88 and the shoes 89 are mounted on an insulating block 90 supported on the upper end of the guide tube 62 and having separate openings through which extend the contact rods 75 and the cord 60.

The pressure of the shoes 89 on the contact rods 75 may be regulated by varying the compression of the coiled springs 91 by means of the adjusting screws 91'.

As shown in Fig. 18, the conducting lead 92 is connected to one pole of a source of electric power, while the conducting lead 93 is connected to one terminal of the operating winding of the belt shifter magnet 68, the other terminal of which is connected with the opposite pole of the source of electric power.

The belt shifter magnet 68 is mounted on a resistance box 68' which is in turn mounted on a bracket 94 fastened to the standard 27.

The resistance box 68' contains a variable resistance by which the speed of the motor may be readily varied.

The belt shifter magnet 68 is provided with a pivoted armature 95 for controlling the belt shifter.

The belt shifter comprises a lever 96 pivoted on a vertical arm 97 of the bracket 94 and having two laterally extending fingers 98, arranged to have the belt 41 positioned therebetween. The lever 96 is held normally in a vertical position by engagement of a latch 99 on the armature 95, with a finger 100 carried by the pivoted lever 96 at the free end thereof.

When the latch 99 is removed from the finger 100 by the operation of the belt shifter magnet 68, the counterweight arm 101 attached to the pivoted lever 96 causes the belt shifter to move to its dotted line position (shown in Fig. 16), thereby shifting the belt 41 from a pulley 42 fixed on the armature shaft to a pulley 42' loose thereon.

The shifting of the belt 41 from the fixed to the loose pulley disconnects the filling machine from the source of power therefor and stops the vibration of the carrier and the rotation of the tamper lifter; consequently insulation ceases to flow from the container into the jacket.

The filled jacket may now be removed from the vibratory carrier and another placed therein.

*Positioning jacket in filling machine.*

Before placing the jacket in the vibratory carrier to be filled with insulation, the helical resistor is arranged in the jacket and one end of the resistor is connected with a terminal which is then rigidly fastened to the jacket in the manner described in my Patent No. 1,359,400 granted November 16, 1920. If desired, the end of the jacket may be closed with a temporary plug instead of the terminal.

When the terminal is rigidly connected to the jacket, no insulation can escape from the end of the jacket while it is being filled. The jacket may now be placed in the vibratory carrier with the terminal or plug fastened thereto resting in the yielding seat 12 of the lower bracket 6 and the upper end of the jacket positioned in the bushing 7 of the upper bracket; the resistor extending through the jacket at the open end thereof and up through the bushing 7 and funnel 8.

The tubular tamper is at this time locked in lifted position by means of the thumb screw 49, so that the lower end of the tubular tamper is held near the upper arm of the carrier bracket 5.

The hook 61 of the tension cord 60 may be connected with the free end of the resistor, and the resistor placed under the desired tension by rotating the reel 64.

The tubular tamper may now be lowered into the jacket until its lower end rests against the terminal or temporary plug.

The filling machine may now be started in operation by restoring the belt shifter to its running position with the latch 99 of the belt shifter magnet 68 engaging the finger 100 of the belt shifter.

The filling machine being in operation, the vibratory carrier is rapidly vibrated vertically and the tamper is periodically lifted and allowed to drop to compress the insulation in the jacket as it is being filled.

The rapid vibration of the insulation container 3 causes the insulation to flow freely and evenly therefrom into the funnel 8 from which it has an unobstructed path into the jacket. The rapid vibration of the jacket as the insulation is being fed into it causes the insulation to fill evenly the space around and about the resistor.

The annular space or passageway between the tubular tamper and the jacket allows the insulation to flow freely down therethrough.

The invention claimed is:

1. In a machine for filling with insulation the jacket of an electric heater having a resistor therein, the combination with a vibratory carrier for the jacket, means for feeding insulation into the jacket, and means for positively centering the resistor continuously and progressively in advance of and as the filling with insulation proceeds.

2. In a machine for filling with insulation the jacket of an electric heater having a helical resistor therein, the combination with a vibratory support for the jacket, means for feeding insulation into the jacket, and means for positively centering the resistor helix continuously in advance of and as the filling with insulation proceeds.

3. In a machine for filling with insulation the jacket of an electric heater having a winding resistor therein, the combination with a vibratory support for the jacket, means for continuously feeding insulation into the jacket, and means for progressively centering the resistor in advance of and as the filling with insulation proceeds.

4. In a machine for filling with insulation the jacket of an electric heater having a resistor arranged therein, the combination with a vibratory carrier for the jacket, means for feeding insulation into the jacket, and means for positively and mechanically spacing the resistor progressively in advance of and as the filling with insulation proceeds.

5. In a machine for filling with insulation the jacket of an electric heater having a resistor arranged therein, the combination with a vibratory carrier for the jacket, means for feeding insulation into the vibrating jacket, and means for mechanically centering the resistor continuously in advance of and as the filling with insulation proceeds.

6. In a machine for filling with insulation the jacket of an electric heater having a helical resistor arranged therein, the combination with a vibratory support for the jacket, means for continuously feeding insulation into the vibrating jacket, and means for positively and mechanically centering or spacing the resistor continuously and progressively in advance of and as the filling with insulation proceeds.

7. A machine for filling the jacket of an electric heater with insulation and thus separating therefrom the heater resistor therein, comprising a support for the jacket, means for continuously feeding insulation into the jacket, a reciprocating tamper for compressing the insulation in the jacket, said tamper having means whereby it continuously and progressively centers said resistor in advance of and as the filling with insulation proceeds.

8. In a machine for filling the jacket of an electric heater with insulation to separate therefrom the heater resistor therein, the combination with a vibratory carrier for the jacket, of a container arranged to feed insulation into the jacket, means for keeping the resistor under tension while the jacket is being filled and means for positively centering the resistor during filling.

9. A machine for filling the jacket of an electric heater with insulation and thus separating therefrom the heater resistor arranged therein, comprising a vibratory carrier, upper and lower brackets carried thereby and arranged to receive the ends of the jacket, a reservoir for the insulation supported by the carrier, and means supported by the carrier and guiding the insulation from the reservoir into the jacket.

10. A machine for filling the jacket of an electric heater with insulation and thus separating therefrom the heater resistor arranged therein, comprising a vibratory carrier having an upper rigid and a lower yielding seat arranged to receive the jacket, and a reservoir for the insulation having a spout arranged adjacent the upper end of the jacket whereby insulation may be discharged through the spout from the reservoir into the jacket.

11. In a machine for filling the jacket of an electric heater with insulation and thus separating therefrom the heater resistor arranged therein, the combination of a vibratory carrier for the jacket, a reservoir for the insulation, means for discharging insulation from the reservoir into the jacket, and means for keeping the resistor in spaced relation to the enclosing jacket as the insulation is being introduced therein.

12. In a machine for filling the jacket of an electric heater with insulation and thus separating therefrom the heater resistor arranged therein, the combination of a vibratory carrier for the jacket, a reservoir for the insulation, means for discharging insulation from the reservoir into the jacket, and a spacing collar for insertion between the resistor and the jacket, the spacing collar being gradually raised as the jacket fills with insulation.

13. In a machine for filling the jacket of an electric heater with insulation and thus separating therefrom the heater resistor arranged therein, the combination of a vibratory carrier for the jacket, a reservoir for the insulation, means for discharging insulation from the reservoir into the jacket, a spacing collar for insertion between the resistor and the jacket, and means for periodically lifting the collar and allowing same to drop.

14. In a machine for filling the jacket of an electric heater with insulation and thus separating therefrom the heater resistor arranged therein, the combination of a vibratory carrier for the jacket, a reservoir for the insulation, means for discharging insulation from the reservoir into the jacket, and means for centering the resistor within the jacket.

15. In a machine for filling the jacket of an electric heater with insulation and thus separating therefrom the heater resistor arranged therein, the combination of a vibratory carrier for the jacket, a reservoir for the insulation, means for discharging insulation from the reservoir into the jacket, and means for keeping the resistor under tension as the insulation is being introduced into the jacket.

16. In a machine for filling the jacket of an electric heater with insulation and thus separating therefrom the heater resistor arranged therein, the combination of a vibratory carrier for the jacket, a reservoir for the insulation, means for discharging insulation from the reservoir into the jacket, and means for tamping the insulation to compress the same in the jacket.

17. In a machine for filling the jacket of an electric heater with insulation and thus separating therefrom the heater resistor arranged therein, the combination of a vibratory carrier for the jacket, a reservoir for the insulation, means for discharging insulation from the reservoir into the jacket, and a tamper for compressing insulation in the jacket as it is being filled.

18. In a machine for filling the jacket of an electric heater with insulation and separating therefrom the heater resistor arranged therein, the combination of a vibratory carrier for the jacket, a reservoir for the insulation, means for discharging insulation from the reservoir into the jacket, a tamper, and means for periodically lifting the tamper and allowing the same to drop to compress the insulation in the jacket.

19. In a machine for filling the jacket of an electric heater with insulation and separating therefrom the heater resistor arranged therein, the combination of a vibratory carrier for the jacket, a reservoir for the insulation, means for discharging insulation from the reservoir into the jacket, a tamper, and a pair of rotatable yielding jaws for periodically engaging and raising the tamper and allowing same to drop to compress the insulation in the jacket.

20. A machine for filling the jacket of an electric heater with insulation to separate therefrom the heater resistor arranged therein, comprising a support for the jacket, a reservoir arranged to discharge insulation therefrom into the jacket, and a tamper periodically lifted and allowed to drop to compress the insulation in the jacket, said tamper having parts interposed between the jacket and the resistor to center the latter within the former.

21. A machine for filling the jacket of an electric heater with insulation to separate therefrom the heater resistor arranged therein, comprising a support for the jacket, a reservoir for the insulation arranged to discharge the same into the jacket, a tubular tamper for centering the resistor within the jacket, and means for periodically lifting the tamper and allowing it to drop to compress the insulation in the jacket.

22. In a machine for filling the jacket of an electric heater with insulation and thus separating therefrom the heater resistor arranged therein, a tube for surrounding the resistor and providing an unobstructed annular opening through which the insulation may be introduced into the jacket.

23. In a machine for filling the jacket of an electric heater with insulation for separating therefrom the heater resistor arranged therein, the combination of a vibratory carrier for the jacket, a reservoir arranged to feed the insulation therefrom into the jacket, and means for rapidly vibrating the carrier, such means including a spring and a rotatable disc provided with a plurality of rollers projecting from the periphery thereof.

24. In a machine for filling the jacket of an electric heater with insulation for separating therefrom the heater resistor arranged therein, the combination of a support for the jacket, a reservoir arranged to feed insulation therefrom into the jacket, and a tamper arranged to surround the resistor, means for periodically lifting the tamper and allowing same to drop, and a plurality of outwardly extending radial lugs on the tamper for spacing the same from the jacket.

25. A machine for filling the jacket of an electric heater with insulation and thus separating therefrom the heater resistor arranged therein, comprising a vibratory carrier, a container supported thereby and arranged to feed insulation therefrom into the jacket, and a tamper having operating means whereby it is periodically lifted and allowed to drop to compress the insulation in the jacket.

26. A machine for filling the jacket of an electric heater with insulation and thus separating therefrom the heater resistor arranged therein, comprising a support for the jacket, a container for the insulation, means for feeding the insulation from the container into the jacket, a tamper giving clearance for the resistor, and means for periodically lifting the tamper and allowing the same to drop to compress the insulation in the jacket.

27. A machine for filling the jacket of an electric heater with insulation and thus separating therefrom the heater resistor arranged therein, comprising a support for the jacket, a container for the insulation, means for feeding the insulation from the container into the jacket, a tamper, and a pair of cooperating yielding jaws periodically lifting and dropping the tamper, whereby the insulation is compressed in the jacket.

28. A machine for filling the jacket of an electric heater with insulation and thus separating therefrom the heater resistor arranged therein, comprising a support for the jacket, a container for the insulation, means for feeding the insulation from the container into the jacket, a tamper, and a pair of cooperating rotatable jaws for engaging and lifting the tamper and allowing the same to drop at regular intervals to compress the insulation in the jacket.

29. In a machine for filling the jacket of an electric heater with insulation to separate therefrom the heater resistor arranged therein, the combination of a vibratory carrier for the jacket, a container for the insulation, means for continuously feeding the insulation from the container into the jacket, a tamper, and a regulator for determining the rate at which the insulation is fed from the container.

30. In a machine for filling the jacket of an electric heater with insulation, the combination of a vibratory carrier, upper and lower brackets fastened thereto and receiving and holding the jacket, a container supported by said carrier, from which insulation is fed into the jacket and a reciprocating tamper having radial lugs between which the insulation may pass.

31. In a machine for filling the jacket of an electric heater with insulation to separate therefrom the heater resistor arranged therein, the combination of a vibratory carrier, upper and lower brackets therefor arranged to support the jacket therebetween, one of the brackets being adjustable on the carriage, whereby jackets of different lengths may be supported therebetween, and a container supported on the carrier and arranged to feed insulation therefrom into the jacket.

32. In a machine for filling the jacket of an electric heater with insulation to separate therefrom the heater resistor arranged therein, the combination of a vibratory carrier for the jacket, a container supported on the carrier and arranged to feed insulation therefrom into the jacket, and adjustable means for keeping the resistor under tension while the jacket is being filled.

33. In a machine for filling the jacket of an electric heater with insulation to separate therefrom the heater resistor arranged therein, the combination of a vibratory carrier, upper and lower brackets rigidly secured thereto, a yielding seat carried by the lower bracket and cooperating with the upper bracket to support the jacket, and a container supported by the carrier and arranged to feed insulation therefrom into the jacket.

34. In a machine for filling the jacket of an electric heater with insulation to separate therefrom the heater resistor arranged therein, the combination of a vibratory carrier, upper and lower brackets thereon arranged to receive and support the jacket, and a container fastened to the upper bracket and arranged to feed insulation therefrom into the jacket.

35. A machine for filling the jacket of an electric heater with insulation to separate therefrom the heater resistor arranged therein, comprising a vibratory carrier, upper and lower brackets thereon arranged to receive and support the jacket, and an intermediate bracket fastened to the carrier and having a clamp for engaging the jacket to keep the same straight.

36. A machine for filling the jacket of an electric heater with insulation and separating therefrom the heater resistor arranged therein, comprising a vibratory carriage for the jacket, a container arranged to feed insulation therefrom into the jacket, a tamper for tamping the insulation in the jacket, and a lifter periodically engaging the tamper.

37. A machine for filling the jacket of an electric heater with insulation and separating therefrom the heater resistor arranged therein, comprising a vibratory carrier for supporting the jacket vertically, a container for the insulation arranged when vibrated to feed insulation therefrom into the jacket, means for vibrating the container, and means rendered effective when the insulation reaches a predetermined height in the jacket for stopping the vibration of the container.

38. A machine for filling the jacket of an electric heater with insulation and separating therefrom the heater resistor arranged therein, comprising means for supporting the jacket vertically, a container for the insulation having a spout through which insulation is delivered therefrom to the jacket, means for vibrating the container to feed the insulation therefrom, and means operating automatically when the insulation reaches a predetermined height in the jacket to stop the vibration of the container.

39. In a machine for filling the jacket of an electric heater with insulation and separating therefrom the heater resistor arranged therein, the combination of means for supporting the jacket in a vertical position, a container for the insulation arranged to feed insulation therefrom into the jacket, a tamper for tamping the insulation in the jacket, means for periodically lifting the jacket and allowing the same to drop, and tamper and means controlled by the height of the insulation in the jacket for stopping the operation of the tamper.

40. A machine for filling the jacket of an electric heater with insulation and separating therefrom the heater resistor arranged therein, comprising a vibratory carrier for supporting the jacket vertically, a container for the insulation arranged when vibrated to feed insulation therefrom into the jacket, means for vibrating the container, and means controlled by the height of the insulation in the jacket for stopping the vibration of the container.

In witness whereof, we have hereunto subscribed our names.

EDWIN N. LIGHTFOOT.
ROBERT C. BECK.